Patented July 3, 1934

1,965,499

UNITED STATES PATENT OFFICE 1,965,499

PROCESS FOR THE MANUFACTURE OF DIHYDRO-RESORCINOL

Max Klingenfuss, Basel, Switzerland, assignor to Hoffmann-La Roche Inc., Nutley, N. J., a corporation of New Jersey No Drawing. Application January 30, 1934, Serial No. 709,051. In Germany April 3, 1933

10 Claims. (Cl. 260—131)

So far no satisfactory process for obtaining dihydro-resorcinol is known. Thiele and Jaeger (Berichte der Deutschen Chemischen Gesellschaft vol. 34, 1901, page 2841) obtained dihydro-resorcinol by reduction of hydroxy-hydroquinone with sodium amalgam, v. Schilling and Vorländer (Annalen der Chemie, Vol. 294, 1896, page 269, and vol. 308, 1898, page 190) by condensation of γ-aceto-butyric-acid-ethyl-ester with sodium-ethylate. By the method described in German Patent No. 77,317 dihydro-resorcinol is obtained by reduction of resorcinol. This process however is very complicated and expensive. Although for the reduction about a hundred times the weight of sodium amalgam, calculated on the obtainable quantity of the final product, is required, the yield is small and the working complicated because considerable quantities of resorcinol remain unchanged and have to be removed (Annalen der Chemie, vol. 278, 1893, page 28).

It has now been found that, starting from resorcinol, dihydro-resorcinol may be obtained in a very simple manner and with an almost theoretical yield if solutions of resorcinol are subjected to catalytic hydrogenation in the presence of at least one equivalent of a strongly basic compound.

Resorcinol has already been catalytically hydrogenated (Senderens and Aboulenc, Comptes Rendus de l'Académie des Sciences vol. 173, 1921, page 1366; Chemisches Zentralblatt 1932 I, page 1400), but only more highly hydrogenated products were obtained thereby, namely hexa-hydro-resorcinol in addition to a considerable quantity of cyclo-hexanol. If resorcinol in solution is hydrogenated in the presence of nickel under the conditions described by Senderens, but the reaction interrupted after absorption of the quantity calculated for 2 atoms of hydrogen, a very non-uniform reaction product is obtained, which contains no appreciable quantities of dihydroresorcinol, but consists of more highly hydrogenated products and a great deal of unchanged resorcinol. It was therefore surprising to find that in the presence of substances with an alkaline reaction the catalytic reduction of resorcinol takes a uniform course and is terminated after two atoms of hydrogen have been taken up. The simplest explanation for this uniform course of the reaction is that, once produced, the dihydroresorcinol, which is a rather strong acid, is withdrawn from further hydrogenation by the formation of a stable salt. This explains also why the hydrogenation of resorcinol in the presence of more than one equivalent of alkali takes the same uniform course, whereas in the presence of less than one equivalent of alkali only so much dihydro-resorcinol is obtained, as is equivalent to the quantity of alkali present, the rest yielding more highly hydrogenated products. It is advisable to use one equivalent of alkali to one molecule of resorcinol. Inorganic or organic bases or salts of strongly alkaline reaction may be used, but it is not necessary to use resorcinol likewise in the form of a salt or phenolate. The reaction may be carried out under normal or higher pressure as desired, in aqueous solution, or similarly in the presence of organic solvents.

According to the process described in German Patent No. 571,972 monohydric phenols containing at least one other substituent are subjected to catalytic hydrogenation in the presence of alkali. Hydro-aromatic alcohols are thus obtained possessing no acid properties. In contrast hereto dihydro-resorcinol obtained by the process of this invention represents a di-ketone or cyclohexenoneol with strongly acid properties. With the alkali present in the reaction it forms a stable salt and is thereby withdrawn from further hydrogenation. If however dihydro-resorcinol or resorcinol is hydrogenated without alkali, hydro-aromatic alcohols are obtained in addition to other products.

Example 1

110 parts by weight of resorcinol are dissolved in 400 parts by weight of water containing 40 parts by weight of pure sodium hydroxide. 5 parts by weight of a nickel catalyst, which has been obtained from a mixture of equal parts of nickel carbonate and kieselguhr by seven hours' treatment with hydrogen at 500° C., are added. The reaction mixture is heated in an autoclave to 60° C. and stirred in the presence of hydrogen at 25 atmospheres, until the absorption of hydrogen has ceased. After cooling the reaction product is filtered from the catalyst, the filtrate made acid to congo-paper and exhaustively treated with ether. The ether is distilled off and the residue dried in vacuo at 60° C. Thus 110 parts by weight of dihydro-resorcinol are obtained, possessing the known properties of this product. After a single crystallization from benzene or acetic ester the substance is obtained in pure form.

*Example 2*

110 parts by weight of resorcinol are dissolved in 160 parts by weight of methyl-alcohol and 200 parts by weight of a 20% solution of sodium hydroxide. 5 parts by weight of a nickel catalyst are added and the reaction product treated in an autoclave at 70° C. with hydrogen at 15 atmospheres, until the absorption of hydrogen has quite terminated. The further procedure is the same as described in Example 1. The yield is 95% of the theoretical.

*Example 3*

110 parts by weight of resorcinol and 29 parts by weight of calcium-oxide together with 400 parts by weight of water and 2 parts by weight of a nickel catalyst are put into an autoclave and hydrogenated with hydrogen under 15 atmospheres pressure at 70° C. When the uptake of hydrogen has stopped the product is filtered from the catalyst, the filtrate is saturated with carbon dioxide and evaporated in vacuo until crystallization sets in. The residue is made distinctly acid to congo-paper with hydrochloric acid; after standing some time part of the dihydro-resorcinol crystallizes from the product in particularly pure form. From the mother liquors the remaining yield is obtained by exhaustive extraction with ether. The yield is at least 95%.

*Example 4*

110 parts by weight of resorcinol are dissolved in 200 parts by weight of alcohol and 76 parts by weight of diethylamine are added. After addition of 5 parts by weight of a nickel catalyst the mixture is hydrogenated in the manner described in the foregoing examples. The further procedure is the same as in Example 1. The yield is at least 95%.

*Example 5*

110 parts by weight of resorcinol are dissolved in 400 parts by weight of a 10% solution of sodium hydroxide and after addition of 0.4 parts by weight of palladium chloride and 10 parts by weight of adsorptive charcoal shaken with hydrogen at atmospheric pressure. The absorption of hydrogen slowly sets in already at room temperature and is completed by heating to 45% C. The further procedure is the same as described in Example 1. The yield is 95% of the theoretical.

*Example 6*

110 parts by weight of resorcinol are dissolved in 400 parts by weight of a 10% solution of sodium hydroxide and after addition of 1 part by weight of platinum tetrachloride and 5 parts by weight of adsorptive charcoal shaken with hydrogen at atmospheric pressure. The absorption of hydrogen begins at room temperature and is terminated by mild heating to 40° C. The further procedure is the same as described in Example 1. The yield is 97% of the theoretical.

*Example 7*

110 parts by weight of resorcinol and 344 parts by weight of crystalline tertiary sodium phosphate ($Na_3PO_4, 10H_2O$) are dissolved in 700 parts by weight of water. After addition of 5 parts by weight of a nickel catalyst the solution is allowed to react with hydrogen at 20 atmospheres in an autoclave at 80–90° C. The further procedure is the same as described in Example 1. The yield is 95% of the theoretical.

I claim:

1. The process for the manufacture of dihydro-resorcinol, which consists in subjecting solutions of resorcinol in the presence of at least one equivalent of a strongly basic compound to catalytic hydrogenation.

2. The process for the manufacture of dihydro-resorcinol, which consists in subjecting solutions of resorcinol in the presence of at least one equivalent of a strongly basic compound to catalytic hydrogenation with a nickel catalyst.

3. The process for the manufacture of dihydro-resorcinol, which consists in subjecting solutions of resorcinol in the presence of at least one equivalent of alkali to catalytic hydrogenation.

4. The process for the manufacture of dihydro-resorcinol, which consists in subjecting solutions of resorcinol in the presence of at least one equivalent of alkali to catalytic hydrogenation with a nickel catalyst.

5. The process for the manufacture of dihydro-resorcinol, which consists in subjecting solutions of resorcinol in the presence of at least one equivalent of sodium hydroxide to catalytic hydrogenation.

6. The process for the manufacture of dihydro-resorcinol, which consists in subjecting solutions of resorcinol in the presence of at least one equivalent of sodium hydroxide to catalytic hydrogenation with a nickel catalyst.

7. The process for the manufacture of dihydro-resorcinol, which consists in subjecting solutions of resorcinol in the presence of at least one equivalent of dialkylamine to catalytic hydrogenation.

8. The process for the manufacture of dihydro-resorcinol, which consists in subjecting solutions of resorcinol in the presence of at least one equivalent of dialkylamine to catalytic hydrogenation with a nickel catalyst.

9. The process for the manufacture of dihydro-resorcinol, which consists in subjecting solutions of resorcinol in the presence of at least one equivalent of diethylamine to catalytic hydrogenation.

10. The process for the manufacture of dihydro-resorcinol, which consists in subjecting solutions of resorcinol in the presence of at least one equivalent of diethylamine to catalytic hydrogenation with a nickel catalyst.

MAX KLINGENFUSS.